(12) United States Patent
Craft

(10) Patent No.: US 6,860,229 B1
(45) Date of Patent: Mar. 1, 2005

(54) ANT-PROOF PET FOOD BOWL

(76) Inventor: David Blain Craft, 1700 Lindstrom Rd., Crosby, TX (US) 77532

(*) Notice: Subject to any disclaimer, the term of this patent is extended or adjusted under 35 U.S.C. 154(b) by 0 days.

(21) Appl. No.: 10/653,110

(22) Filed: Sep. 3, 2003

(51) Int. Cl.$^7$ .............................................. A01K 7/00
(52) U.S. Cl. ................................................ 119/61.5
(58) Field of Search ................ 119/61, 51.5, 51.04, 119/51.01; D30/121, 129, 130, 131, 132, 133; D7/584, 555, 557, 543, 552, 540, 546; 220/503, 504, 505, 506; 206/562, 564

(56) References Cited

U.S. PATENT DOCUMENTS

| | | | | |
|---|---|---|---|---|
| 1,613,671 A | * | 1/1927 | O'Donnell | 220/573.4 |
| D160,688 S | * | 10/1950 | Brock | D7/501 |
| 3,756,462 A | * | 9/1973 | Cain | 220/23.83 |
| 4,130,200 A | * | 12/1978 | Iepson et al. | 206/705 |
| 4,399,772 A | * | 8/1983 | Salinas | 119/51.5 |
| 4,802,302 A | | 2/1989 | Alnafissa | |
| 4,966,099 A | * | 10/1990 | Arney | 119/61 |
| 5,125,363 A | * | 6/1992 | McGaha | 119/51.5 |
| 5,277,149 A | * | 1/1994 | East | 119/51.5 |
| 5,285,749 A | | 2/1994 | Byer | |
| 5,467,738 A | * | 11/1995 | Cass | 119/61 |
| 5,619,952 A | | 4/1997 | Walker | |
| 5,732,847 A | * | 3/1998 | Caldi | 220/575 |
| 5,794,564 A | * | 8/1998 | Paro | 119/61 |
| 5,799,787 A | * | 9/1998 | Talbot | 206/315.11 |
| 6,125,790 A | * | 10/2000 | Breedwell | 119/51.5 |

* cited by examiner

Primary Examiner—Thomas Price
(74) Attorney, Agent, or Firm—M. K. Silverman; Yi Li

(57) ABSTRACT

A double level ant-proof pet food bowl includes a top food container having a first recess at a center of a bottom side of a base of the food container; bottom water container having a second recess at a center of an upper side of a base of the water container; and a central post having an upper end inserted into the first recess, and a lower end inserted into the second recess. The top food container resides on top of the central post and above the bottom water container.

13 Claims, 3 Drawing Sheets

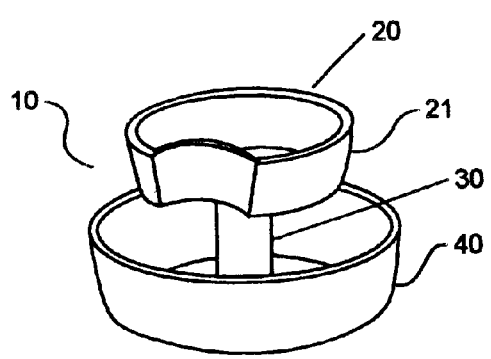
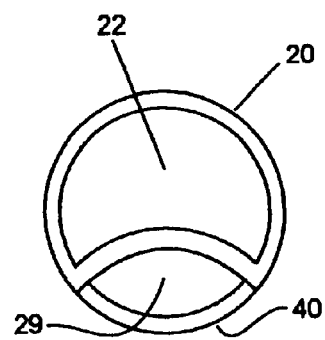
Fig. 5  Fig. 6
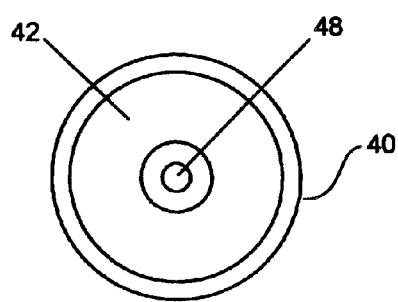
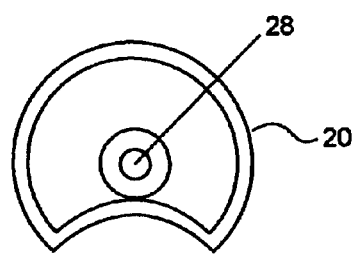
Fig. 7  Fig. 8

ANT-PROOF PET FOOD BOWL

FIELD OF THE INVENTION

The present invention relates to an ant-proof pet food bowl, more particularly, relates to a double level pet food bowl which has a bottom water container to prevent ant getting into the food container resided on the top.

BACKGROUND OF THE INVENTION

The present invention relates to a pet bowl with insect repellant and more particularly pertains to preventing ants and insects from getting into a pet's food.

When pet owners feed their pets, they normally place the food in a bowl and then place the bowl on the floor to allow the pet access to the food. Most times, pets, such as dogs, devour their food at one time. Some pets, however, do not eat all their food in one sitting. Thus, the pet will leave the bowl to become involved in some other matter only to return to the bowl at a later time to eat more of their food. A problem exists, especially when the bowl is placed outdoors, with ants and other crawling insects gaining access to the pet's bowl when the pet is not present. Thus a need exists for a bowl that will prevent ants and other crawling insects from getting into the pet's food.

The present invention attempts to solve the abovementioned problem by providing a bowl that will hold pet food and have a barrier extending around the perimeter which will prevent ants and insects from crawling into the bowl. Additionally, an outer cover will prevent the pet from accidentally licking the poison strip.

The use of pet feeding devices is known in the prior art. More specifically, pet feeding devices heretofore devised and utilized for the purpose of preventing a pet's food from being violated are known to consist basically of familiar, expected and obvious structural configurations, notwithstanding the designs encompassed by the prior art which have been developed for the fulfillment of countless objectives and requirements.

By way of example, U.S. Pat. No. 4,802,302 to Alnafissa discloses a pet food dish with insect trapping means comprised of a replaceable adhesive strip attached around the walls of the base of an annular flange overlying the strip to prevent accidental contact. U.S. Pat. No. 5,619,952 to Walker discloses a pet feeder with a pest barrier comprised of a pad with insect repellant and a moat. U.S. Pat. No. 5,285,749 to Byer discloses an ant proof pet dish supported by pillars.

While these devices fulfill their respective, particular objectives and requirements, the aforementioned patents do not describe a pet bowl with insect repellant for preventing ants and insects from getting into a pet's food.

In this respect, the pet bowl with insect barrier according to the present invention substantially departs from the conventional concepts and designs of the prior art, and in doing so provides an apparatus primarily developed for the purpose of preventing ants and insects from getting into a pet's food.

Therefore, it can be appreciated that there exists a continuing need for a new and improved pet bowl with insect repellant which can be used for preventing ants and insects from getting into a pet's food. In this regard, the present invention substantially fulfills this need.

SUMMARY OF THE INVENTION

A double level ant-proof pet food bowl includes a top food container having a first recess at a center of a bottom side of a base of said food container; a bottom water container having a second recess at a center of an upper side of a base of said water container; and a central post having an upper end inserted into said first recess, and a lower end inserted into said second recess, thereby said top food container resides on top of said central post and above said bottom water container.

It is an object of the present invention to provide a new and improved pet bowl with insect barrier which has all the advantages of the prior art pet feeding devices and none of the disadvantages.

It is another object of the present invention to provide a new and improved pet bowl with insect barrier which may be easily and efficiently marketed.

It is a further object of the present invention to provide a new and improved pet bowl with insect barrier which is of durable and reliable construction.

An even further object of the present invention is to provide a new and improved pet bowl with insect repellent and is susceptible of a low cost of manufacture with regard to both materials and labor, and which accordingly is then susceptible of low prices of sale to the consuming public, thereby making such a pet bowl with insect repellent economically available to the buying public.

The above and other objects and advantages of the present invention will become apparent from the hereinafter Brief Description of the Drawings, Detailed Description of the Invention and claims appended herewith.

BRIEF DESCRIPTION OF THE DRAWINGS

FIG. 5 is perspective view of the double level ant-proof pet food bowl of another embodiment of the present invention.

FIG. 6 is a top view of the double level ant-proof pet food bowl of FIG. 5.

FIG. 7 is a top view of the bottom water container of the double level ant-proof pet food bowl of FIG. 5.

FIG. 8 is a top view of the top food container of the double level ant-proof pet food bowl of FIG. 5.

DETAILED DESCRIPTION OF THE INVENTION

Figure 1:
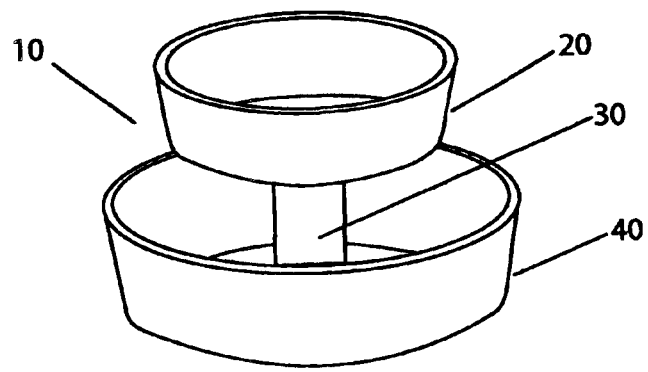
FIG. 1 is a perspective view of the double level ant-proof pet food bowl of one embodiment of the present invention.

In one embodiment, the present invention provides a double level ant-proof pet food bowl 10 as shown in FIG. 1. The double level ant-proof pet food bowl 10 comprises a top food container 20, connected by a central post 30 to a bottom water container 40.

Figure 2:
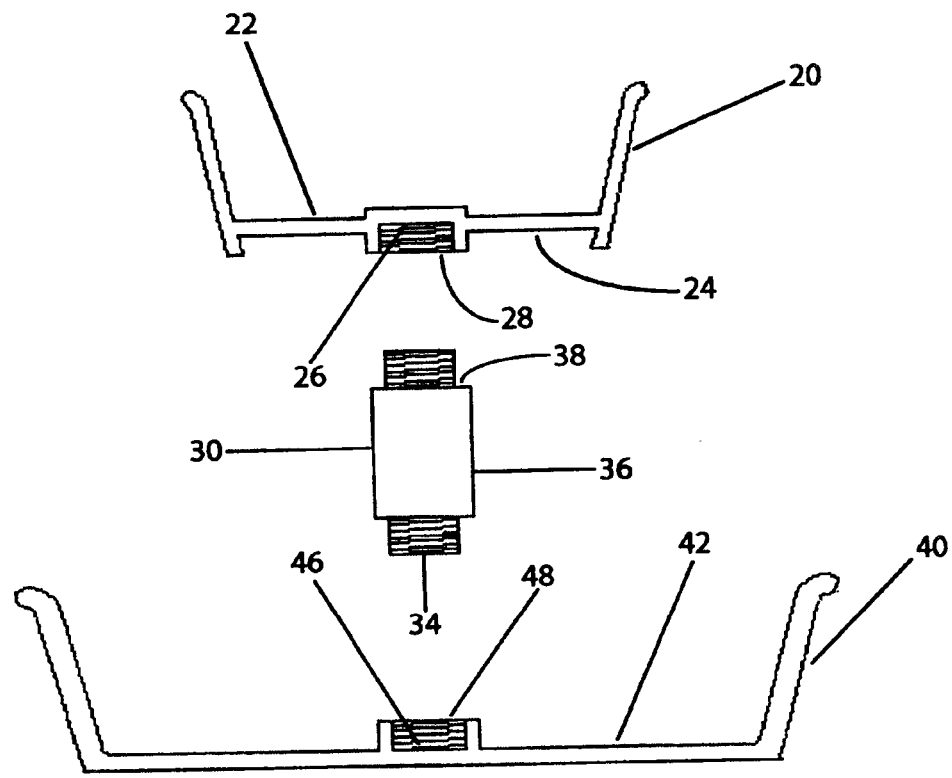
FIG. 2 is an exploded side view of the double level ant-proof pet food bowl of FIG. 1.

As shown in FIG. 2, the top food container 20 has a base 22 which has a recess 28 at the center 26 of the bottom side 24. The bottom water container 40 also has a base 42 which has a recess 48 at the center 46 of the upper side 44. The central post 30 has an upper end 32 and a lower 34, which are complementary in structure to the recess 28 of the top food container 20 and the recess 48 of the bottom water container 40, respectively. The upper end 32 of the central post 30 is inserted into the recess 28, and the lower end 34 is inserted into the recess 48, thereby the top food container 20 resides on top of the central post 30 and above the bottom water container 40.

In FIG. 2, the central post 30 is cylindrical and has male threads at the upper end 32 and lower end 34. The recesses 28 and 48 have complementary female threads for connection with the central post 30. As shown, the central post 30 can be screwed into the recesses 28 and 48. The central post 30 has a middle portion 36 which has a diameter larger than those of upper end 32 and lower end 34. Once the upper end 32 is inserted into the recess 28, the upper end 38 of the middle portion 36 is in contact with the bottom side 24 of the top food container 20, therefore, providing a further support to the top food container. It is preferred that the central post 30 is removable from the top food container 20 and the bottom water container 40, so that the pet food bowl 10 can be thoroughly cleaned when it is desired.

Figure 3:
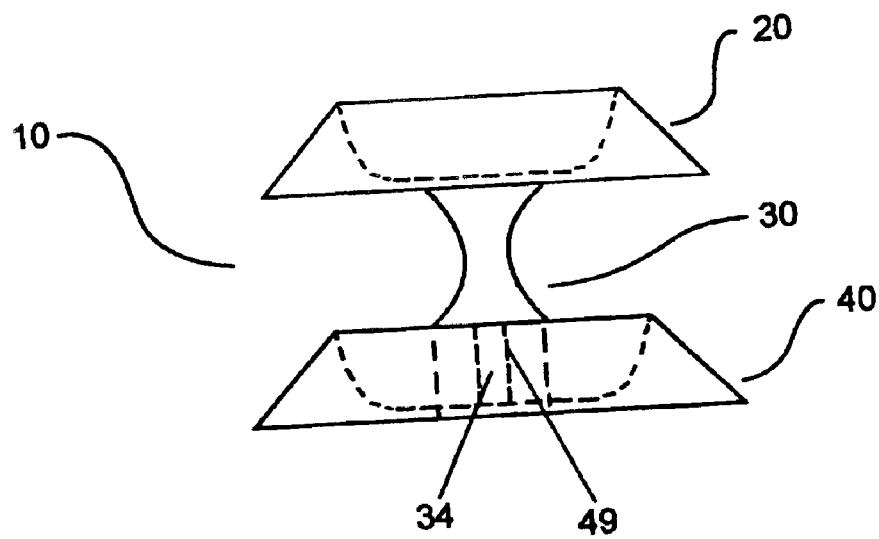
FIG. 3 is a perspective view of the double level ant-proof pet food bowl of a further embodiment of the present invention.
Figure 4:
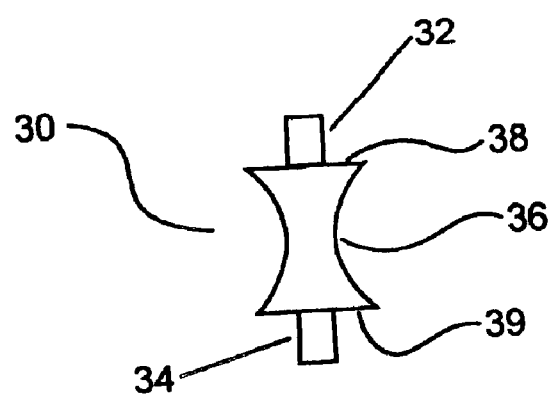
FIG. 4 is a side view of the central post of the double level ant-proof pet food bowl of FIG. 3.

For the purpose of the present invention, other suitable connections can also be utilized. FIG. 4 shows another type of central post 30 and its connection with the top food container 20 and the bottom water container 40 as shown in FIG. 3. In this embodiment, the upper end 32 and lower end 34 of the central post 30 have a cylindrical post shape without threads. As shown, the bottom water container 40 has bore 49 around the center 46 of the base 42. The bottom side 24 of the top food container 20 has a similar bore (not shown). The connection can be achieved by simply inserting the upper end 32 and lower end 34 into the recesses 28 (not shown) and 48. Furthermore, the middle portion 36 has an enlarged upper end 38 and lower end 39 to provide the support at the interfaces with the top food container 20 and the bottom water container 40. It is noted that the central post 30 can also have other shapes, such as elliptical, square and rectangular.

In the embodiment shown in FIGS. 1 and 2, the top food container 20 and the bottom water container 40 have a regular round flat base bowl shape. In another embodiment shown in FIG. 3, the top food container 20 and the bottom water container 40 have a frustoconical configuration. Other suitable container shapes, such as elliptical, square and rectangular, can also be used for the purpose of the instant double level structure. Preferably, the bottom water container 40 has a larger diameter than that of the top food container 20 for the stability of the double level pet food bowl 10.

In use, a pet owner can put pet food inside the top food container 20, and add water inside the bottom water container 40. The central post 30 is immersed in the water. If ants or other insects try to reach the pet food inside the top food container 20, they have to cross the water. Therefore, the water inside the bottom water container 40 prevents ants and other insects to get into the top food container 20.

In a further embodiment, as illustrated in FIGS. 5 to 8, one side or an area of the sidewall 21 of the top food container 20 indents toward the center of the container to create a void space 29. Through the void space 29, a pet can drink water inside the bottom water container 40. With this configuration, the bottom water container 40 serves two functions: providing drinking water to a pet, and preventing ants and insects to get into the top food container.

Optionally, the base 42 of the bottom water container 40 can have a few degree of inclination, with the side under the void space 29 lower. With such an inclination, the water will always run to the side under the void space 29 so that there is drinking water accessible to the pet even when the quantity of water is small. In one embodiment, the inclination is about 4 degree. To ensure the alignment of the void space 29 with the lower side of the base 42, alignment means can be provided at the interfaces of the central post 30 with the top food container 20 and with the bottom water container 40. Various alignment means can be used. One example is a sliding slot at the bore 49 of the bottom water container 40 and a complementary alignment key on the central post 30 for aligning the bottom water container 40. The same mechanism applies to the top food container 20.

The double level ant-proof pet food bowl can be made of various types of plastics and other suitable materials, preferably FDA approved for food contact material. One suitable example of the material is polypropylene. Moreover, the material is dish washable and freezable. As illustrated, the double level ant-proof pet food bowl of the present invention has simple structures and can be conveniently manufactured.

While the invention has been disclosed in connection with certain preferred embodiments, this should not be taken as a limitation to all of the provided details. Modifications and variations of the described embodiments may be made without departing from the spirit and scope of the invention, and other embodiments should be understood to be encompassed in the present disclosure as would be understood by those of ordinary skill in the art.

What is claimed is:

1. A double level ant-proof pet food bowl comprising:
   (a) a top food container having a first recess at a center of a bottom side of a base of said food container; wherein one side of food container is indented;
   (b) a bottom water container having a second recess at a center of an upper side of a base of said water container; and
   (c) a central post having an upper end inserted into said first recess, and a lower end inserted into said second recess, thereby said top food container resides on top of said central post and above said bottom water container;
   wherein said indented top food container provides a void space for a pet to drink water from said bottom water container.

2. The double level ant-roof pet food bowl of claim 1, wherein said void space is semi-circular.

3. The double level ant-proof pet food bowl of claim 2, wherein said top food container and said bottom water container have a circular periphery.

4. The double level ant-proof pet food bowl of claim 3, wherein said top food container is smaller in diameter than said bottom water container.

5. The double level ant-proof pet food bowl of claim 1, wherein said central post is removable from said top rood container and said bottom water container.

6. The double level ant-proof pet food bowl of claim 5, wherein said central post is cylindrical.

7. The double level ant-proof pet food bowl of claim 6, wherein said central post has a middle portion having a diameter larger than said upper end and said lower end.

8. The double level ant-proof pet food bowl of claim 1, wherein said upper side of said base of said bottom water container has an inclined surface.

9. The double level ant-proof pet food bowl of claim 8 further comprising alignment means to align said void space with a lower side of said inclined surface.

10. A double level ant-proof pet food bowl comprising:
    (a) a bottom water container having a bottom recess at a center of an upper side of a base of said water container; said upper side of said base having an inclined surface;

b) a top food container having a top recess at a center of a bottom side of a base of said food container; wherein one side of said top food container is indented to provide a void space for a pet to drink water from said bottom water container;

(c) a central post having an upper end inserted into said top recess, and a lower end inserted into said bottom recess, thereby said top food container resides on top of said central post and above said bottom water container;

(d) alignment means to align said indented side of said top food container with a lower side of said inclined surface of said bottom water container for accumulating water under said void space for drinking.

11. The double level ant-proof pet food bowl of claim 10, wherein said top food container is smaller transversely than said bottom water container.

12. The double level ant-proof pet food bowl of claim 10, wherein said central post is removable from said top food container and said bottom water container.

13. The double level ant-proof pet food bowl of claim 12, wherein said central post has a enlarged middle portion, wherein an upper end and a lower end of said middle portion provide increased contact surfaces with said top food container and said bottom water container, respectively, to enhance supports.

* * * * *